United States Patent
Byron et al.

(10) Patent No.: US 10,769,377 B2
(45) Date of Patent: Sep. 8, 2020

(54) LEARNING OBJECT/ACTION PAIRS FOR RECIPE INGREDIENTS

(71) Applicant: International Business Machines Corporation, Armonk, NY (US)

(72) Inventors: Donna K. Byron, Petersham, MA (US); Alexander Pikovsky, Lexington, MA (US); Florian Pinel, New York, NY (US); Timothy P. Winkler, Clinton, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/591,763

(22) Filed: Oct. 3, 2019

(65) Prior Publication Data

US 2020/0034418 A1    Jan. 30, 2020

Related U.S. Application Data

(63) Continuation of application No. 15/017,694, filed on Feb. 8, 2016, now abandoned.

(51) Int. Cl.
*G06F 40/284* (2020.01)
*G06F 40/30* (2020.01)
*G06F 40/211* (2020.01)
*G06F 40/253* (2020.01)

(52) U.S. Cl.
CPC .......... *G06F 40/284* (2020.01); *G06F 40/211* (2020.01); *G06F 40/253* (2020.01); *G06F 40/30* (2020.01)

(58) Field of Classification Search
CPC ....................................................... G06F 40/169
USPC ............................................................. 704/9
See application file for complete search history.

(56) References Cited

U.S. PATENT DOCUMENTS

| | | | |
|---|---|---|---|
| 4,914,590 A * | 4/1990 | Loatman ................ | G06F 40/35 704/8 |
| 5,963,940 A | 10/1999 | Liddy et al. | |
| 6,026,388 A | 2/2000 | Liddy et al. | |
| 6,370,513 B1 | 4/2002 | Kolawa | |
| 8,145,854 B1 | 3/2012 | Lee | |

(Continued)

OTHER PUBLICATIONS

List of IBM Patents or Patent Applictions Treated as Related; (Appendix P), Filed Oct. 3, 2019, 2 pages.

*Primary Examiner* — Bharatkumar S Shah
(74) *Attorney, Agent, or Firm* — Cantor Colburn LLP; Ingrid M. Foerster

(57) ABSTRACT

Aspects include learning object/action pairs for recipe ingredients. A method includes extracting an ingredient list that includes a plurality of entries from a recipe stored in an electronic format. Each of the plurality of entries includes one or more words. For each multi-word entry in the ingredient list, an ingredient associated with the entry is identified by comparing words contained in the entry to terms in a lexicon of cooking domain terms. It is determined whether an action corresponds to the identified ingredient. The determining includes parsing the entry to locate a verb that is associated with the identified ingredient. Based on determining that an action corresponds to the identified ingredient, a food item action pair that includes the identified ingredient and the located verb is output.

20 Claims, 5 Drawing Sheets

| RECIPE INGREDIENT LIST ENTRIES    102 | FOOD ITEM/ACTION PAIR    104 |
|---|---|
| SPRIGS FRESH THYME, CHOPPED | → FRESH THYME/CHOP |
| 2 LARGE GARLIC CLOVES, SMASHED FLAT | → GARLIC CLOVE/SMASH FLAT |
| 1 LEMON, QUARTERED | → LEMON/QUARTER |
| 2 TEASPOONS FINE SEA SALT | → N/A |
| ½ TEASPOON FRESHLY GROUND BLACK PEPPER | → BLACK PEPPER/GRIND |
| 1 TABLESPOON POWDERED SUGAR, SIFTED | → CONFECTIONARY SUGAR/SIFT |
| 1 POUND BEEF TOP SIRLOIN STEAK (PREFERABLY PRIME), TRIMMED, VERY THINLY SLICED WITH THE GRAIN | → TOP SIRLOIN STEAK/TRIM <br> → TOP SIRLOIN STEAK/SLICE |
| 1 POUND LOAF CIABATTA BREAD, ENDS TRIMMED, BREAD CUT CROSSWISE INTO 6 PIECES (EACH ABOUT 5X3 INCHES), EACH HALVED HORIZONTALLY | → CIABATTA BREAD/TRIM <br> → CIABATTA BREAD/CUT <br> → CIABATTA BREAD/HALVE |
| 2 10-OUNCE FROZEN UNCOOKED LOBSTER TAILS, THAWED, OR 1 POUND FRESHLY COOKED LOBSTER MEAT, CUT INTO BITE-SIZE PIECES | → LOBSTER TAIL/UNCOOK <br> → LOBSTER TAIL/FREEZE <br> → LOBSTER TAIL/THAW <br> → LOBSTER MEAT/COOK <br> → LOBSTER MEAT/CUT |

(56) References Cited

U.S. PATENT DOCUMENTS

| | | | |
|---|---|---|---|
| 2009/0092723 A1* | 4/2009 | Flynn, Jr. | G05D 23/1951 |
| | | | 426/523 |
| 2014/0136561 A1* | 5/2014 | Fahey | G06F 16/957 |
| | | | 707/758 |
| 2014/0201185 A1* | 7/2014 | Chang | G06F 16/367 |
| | | | 707/709 |
| 2015/0290795 A1* | 10/2015 | Oleynik | B25J 9/0081 |
| | | | 700/257 |
| 2017/0228364 A1 | 8/2017 | Byron et al. | |

* cited by examiner

LEARNING OBJECT/ACTION PAIRS FOR RECIPE INGREDIENTS

DOMESTIC PRIORITY

This application is a continuation of U.S. patent application Ser. No. 15/017,694, filed Feb. 8, 2016, the content of which is incorporated by reference herein in its entirety.

BACKGROUND

The invention relates generally to extracting information from text data, and more specifically, to learning object/action pairs for recipe ingredients.

Creating a model for action/object compatibility is challenging in any domain. It can be very time consuming to create a model manually. Generally, learning a model from a data corpus is both faster and more reliable. However, in the cooking domain there are often syntactical inconsistencies that can make it difficult to figure out dividing lines in order to generate rules for a model. For example, in the cooking domain, the action of removing an inedible exterior wrapping from a food item can be called, among other things, skinning, peeling, or shelling. Continuing with the example, bananas grow within peels or skins, shrimp grow within shells, and peas grow within pods. One can remove the skin or peel the banana, however one cannot "shell the banana"; one can shell the shrimp or peel the shrimp but cannot "skin the shrimp", and one can shell the peas or peel the peas but cannot "skin the peas" or "pod the peas." These types of semantic subdivisions among what are normally considered to be synonymous terms can make it difficult to automate the process of learning a model to express cooking domain actions.

SUMMARY

According to an embodiment a method, system, and computer program product for learning object/action pairs for recipe ingredients is provided. A method includes extracting an ingredient list that includes a plurality of entries from a recipe stored in an electronic format. Each of the plurality of entries includes one or more words. For each multi-word entry in the ingredient list an ingredient associated with the entry is identified by comparing words contained in the entry to terms in a lexicon of cooking domain terms. It is determined whether an action corresponds to the identified ingredient. The determining includes parsing the entry to locate a verb that is associated with the identified ingredient. Based on determining that an action corresponds to the identified ingredient, a food item action pair that includes the identified ingredient and the located verb is output.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments described herein are directed to learning object/action pairs for recipe ingredients in order to define what actions can be performed on particular food items. Input to embodiments can include a corpus of recipes that are analyzed to learn, for example, that a banana can be peeled or skinned, that shrimp can be shelled or peeled, and that peas can be shelled. This information about what actions can be paired with particular food items can be used by a recipe generator such as Chef Watson™ from IBM to create new recipes.

Contemporary computational linguistic methods for determining verb/noun collocation patterns rely on high-precision parsing to collect verb/argument pairs. However, in the cooking domain, recipe text is often difficult to parse with standard parsers. The text does not conform to standard sentence structure and there is a higher than average level of reduction in the text to conserve space. For example, function words are typically left out and without function words a predicate-argument structure is challenging to reconstruct. For example, note the absence of determiners and missing objects in the following text: "Cook red beet in large pot of boiling salted water. Using slotted spoon, transfer to bowl; set aside." The idiosyncrasies of this genre (e.g., recipe text) can make it especially challenging to learn verb/argument collations from running text.

Embodiments described herein restrict the analysis of recipe text data to only the ingredient list of a recipe. The ingredients list can be a reliable source for learning these pairings because each entry in the ingredients list explicitly names the ingredient to be used. In addition, each entry may contain one or more actions to be performed. The association between the action and the argument (i.e., the ingredient) can be more straightforward to capture since each ingredient entry typically lists only one ingredient. In embodiments, more complex ingredient specifications in a ingredient list can be excluded from the analysis.

Embodiments can be utilized to create and/or to update a lexicon that associates food items and the actions that can be performed on each ingredient by parsing ingredient entries within recipes. This is contrasted with contemporary methods, which utilize standard parsing on running text in a recipe to collect verb/argument collocations. Contemporary methods can be unreliable due to parsing errors that are often prevalent due to the nature of recipe text.

Embodiments described herein are not limited to text that contains recipes as they can be applied to any text genre in which each document contains a section of tightly constrained language, such as, but not limited to: a materials list that accompanies craft instructions, a packing checklist, a materials manifest, and/or a product catalog.

Figure 1:
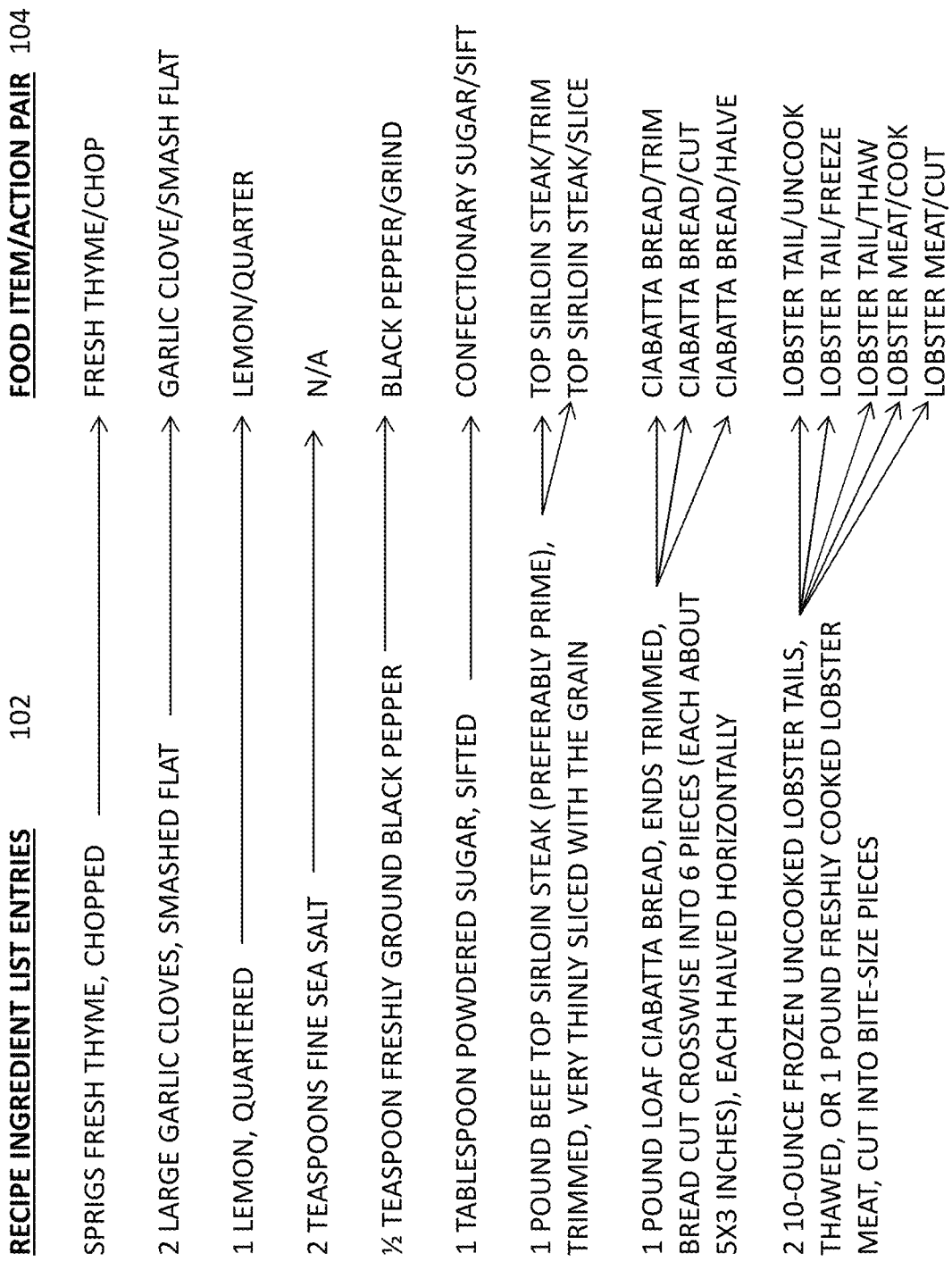
FIG. 1 depicts an example ingredient list and corresponding food item/action pairs in accordance with an embodiment.

Turning now to FIG. 1, an example ingredient list and corresponding food item/action pairs is generally shown in accordance with an embodiment. FIG. 1 includes a first column that includes an example ingredient list 102 from a recipe, and a second column that includes corresponding food item/action pairs 104 for entries in the ingredient list. As shown in FIG. 1 each entry in the ingredient list 102 includes one or more words. In an embodiment, an ingredient list is input to a food item/action learning engine and the list of food item/action pairs is output. In embodiments, food item/action pairs are generated by the learning engine only for those entries in the ingredient list 102 that are multi-word entries. Some of the entries in the ingredient list 102 shown in FIG. 1 generate single food item/action pairs, e.g., "springs fresh thyme, chopped" generates the pair "fresh thyme/chop". Other entries in the ingredient list 102 don't generate any food item/action pairs, e.g., "2 teaspoons fine sea salt" doesn't contain a verb and thus, doesn't teach a food item/action pair. Entries in the ingredient list 102 can also generate multiple food item/action pairs for a single food item, e.g., "1 pound beef top sirloin steak (preferably prime), trimmed, very thinly sliced with the grain" can generate the pairs "top sirloin steak/trim" and "top sirloin steak/slice." Other entries in the ingredient list 102 can generate food item/action pairs for different food items, e.g., "2 10-ounce frozen uncooked lobster tails, thawed, or 1 pound freshly cooked lobster meat, cut into bite-sized pieces" can generate food item/action pairs for both "lobster tail" and "lobster meat." Further, some entries in the ingredient list 102 can generate a food item/action pair with the ingredient name replaced with a semantic referent from a lexicon, e.g., "1 tablespoon powdered sugar, sifted" can generate the pair "confectionary sugar/sift."

Figure 2:
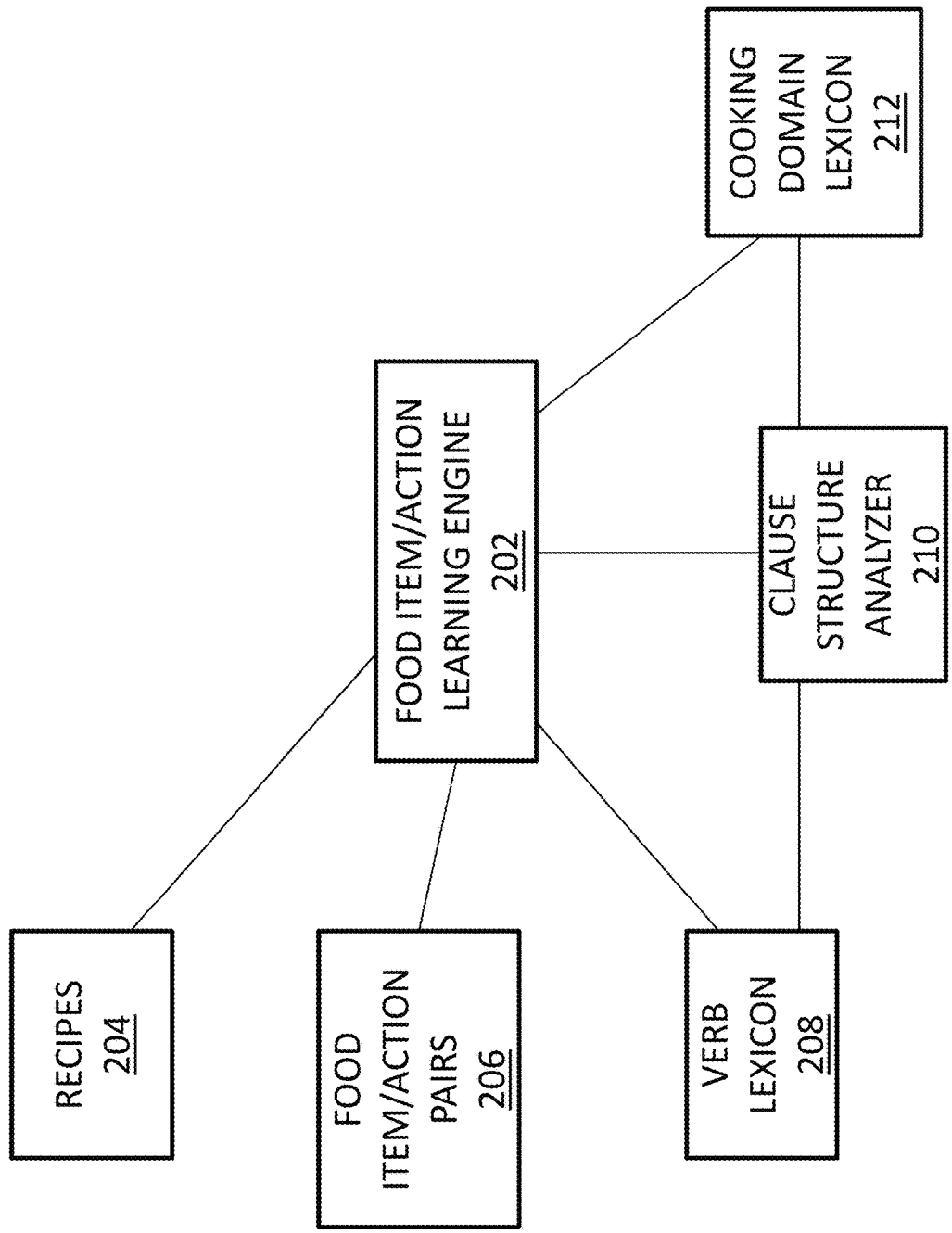
FIG. 2 depicts a block diagram of a component architecture upon which food item/action pairs can be learned from recipes in accordance with an embodiment.

Turning now to FIG. 2, a block diagram of a component architecture upon which food item/action pairs can be learned from recipes is generally shown in accordance with an embodiment. The architecture shown in FIG. 2 includes a food item/action learning engine 202, a corpus of recipes 204, learned food item/action pairs 206, a verb lexicon 208, a clause structure analyzer 210, and a cooking domain lexicon 212.

The corpus of recipes 204 can include recipes from any of a variety of sources of recipes such as, but not limited to: scanned copies of hardcopy cookbooks, and recipes from Internet websites. The documents containing the recipes can be in text format or image format (e.g., PDF), and can include graphics and/or photos. A typical recipe document can have several sections such as a title, a serving size, a picture, an ingredient list, an oven setting, and detailed instructions. Any manner of identifying a section of a recipe that has an ingredient list can be implemented by embodiments. In an embodiment, the section that has the ingredient list is identified based on an HTML tag or the structure of the document.

The cooking domain lexicon 212 shown in FIG. 2 includes a dictionary of food related terms the can correspond to ingredients in a recipe. The cooking domain lexicon 212 can be based on, for example, on a USDA food list and supplemented with additional information. The cooking domain lexicon 212 can be used to identify the ingredients in a recipe. The cooking domain lexicon 212 can also be used to convert an ingredient name used in the ingredient list into a common semantic referent to provide a common nomenclature for ingredients that may be referred to by a variety of labels. In an embodiment, the lexicon has key values for each unique food item. For example, "confectionary sugar" and "powdered sugar" can have the same key value in the cooking domain lexicon 212, with the food item "powdered sugar" being replaced with "confectionary sugar" as part of generating the food item/action pairs 206. In embodiments, the key values can be used to translate between different languages (e.g., English to Spanish). In embodiments, the key values can be used to decipher shorthand references and/or nicknames of ingredients. The term used in the recipe is referred to herein as the "surface form" and the common term that it is replaced with is referred to herein as the "semantic referent."

In an embodiment, the clause structure analyzer 210 can be used as a parser for identifying pre and post modifiers of an identified ingredient, including identifying modifiers that are verb participles using, for example, the verb lexicon 208 as input to the identifying. Alternatively, the modifiers that are verb participles can be identified based on part of speech tags from the parser. The clause structure analyzer 210 can also be used as a parser to retain adjectival modifiers as part of the ingredients names (e.g., new potatoes, baby carrots). Components that can be utilized to perform this structural analysis include English Slot Grammar (ESG) parser from IBM and the OpenNLP suite of language processing tools.

The verb lexicon 208 shown in FIG. 2 can be implemented, for example, by a generally available lexicon such as Wordnet or VerbNet, which provide a query interface for determining whether particular words have a verbal reading, and also organizes verbs into synonym sets and an abstraction hierarchy. The abstraction hierarchy represents which verbs are more general expressions versus verbs with more specific meanings (e.g. 'mince' is a more specific kind of 'cut' action).

The architecture shown in FIG. 2 also includes a food item/action learning engine 202, which coordinates the use of the components shown in FIG. 2 to perform the processing described herein. The learning engine 202 outputs the food item/action pairs 206, for example, to a storage device or database. In an embodiment, the list of food item/action pairs 206 also includes a frequency count or indicator of how frequently (e.g., a percentage) a particular food item was paired with a particular action during the learning process. This can help guide subsequent users of the food item/action pairs 206 in determining how often they are paired. The food item/action pairs 206 can be used by a recipe generating tool to determine what actions can be paired with what particular food items.

Figure 3:
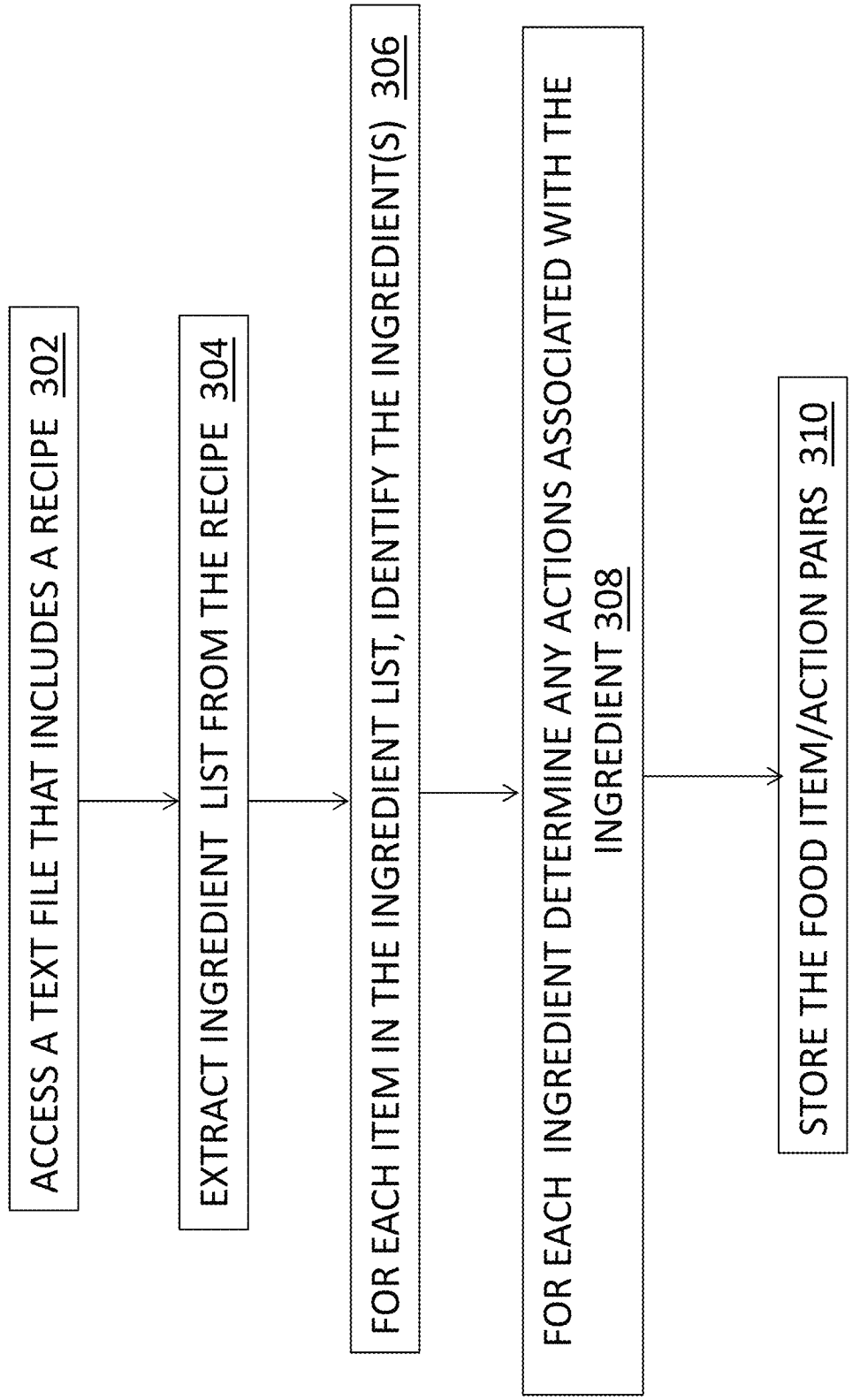
FIG. 3 depicts a flow diagram of a process for learning food item/action pairs in accordance with an embodiment.

Turning now to FIG. 3, a flow diagram of a process for learning food item/action pairs is generally shown in accordance with an embodiment. In an embodiment, the processing shown in FIG. 3 is performed by the learning engine 202 shown in FIG. 2 executing on a processor and using all or a subset of the other components shown in FIG. 2. At block 302, a document that includes a recipe is accessed. An ingredient list, such as the ingredient list 102 shown in FIG. 1, is extracted from the recipe 204 at block 304. At block 306, one or more ingredients are identified for each entry in the ingredient list, using for example, the cooking domain lexicon 212 as input to the identifying. Examples of parsers that can be used for the identifying include, but are not limited to English Slot Grammar (ESG) parser from IBM and the OpenNLP suite of language processing tools. At block 308, any actions associated with each of the identified ingredients are determined using, for example, the verb lexicon 208 and the clause structure analyzer 210 shown in FIG. 2. An embodiment of a process for determining actions associated with ingredients is shown below in FIG. 4. At block 310 of FIG. 3, the food item/action pairs are stored in a database or other storage location.

Figure 4:
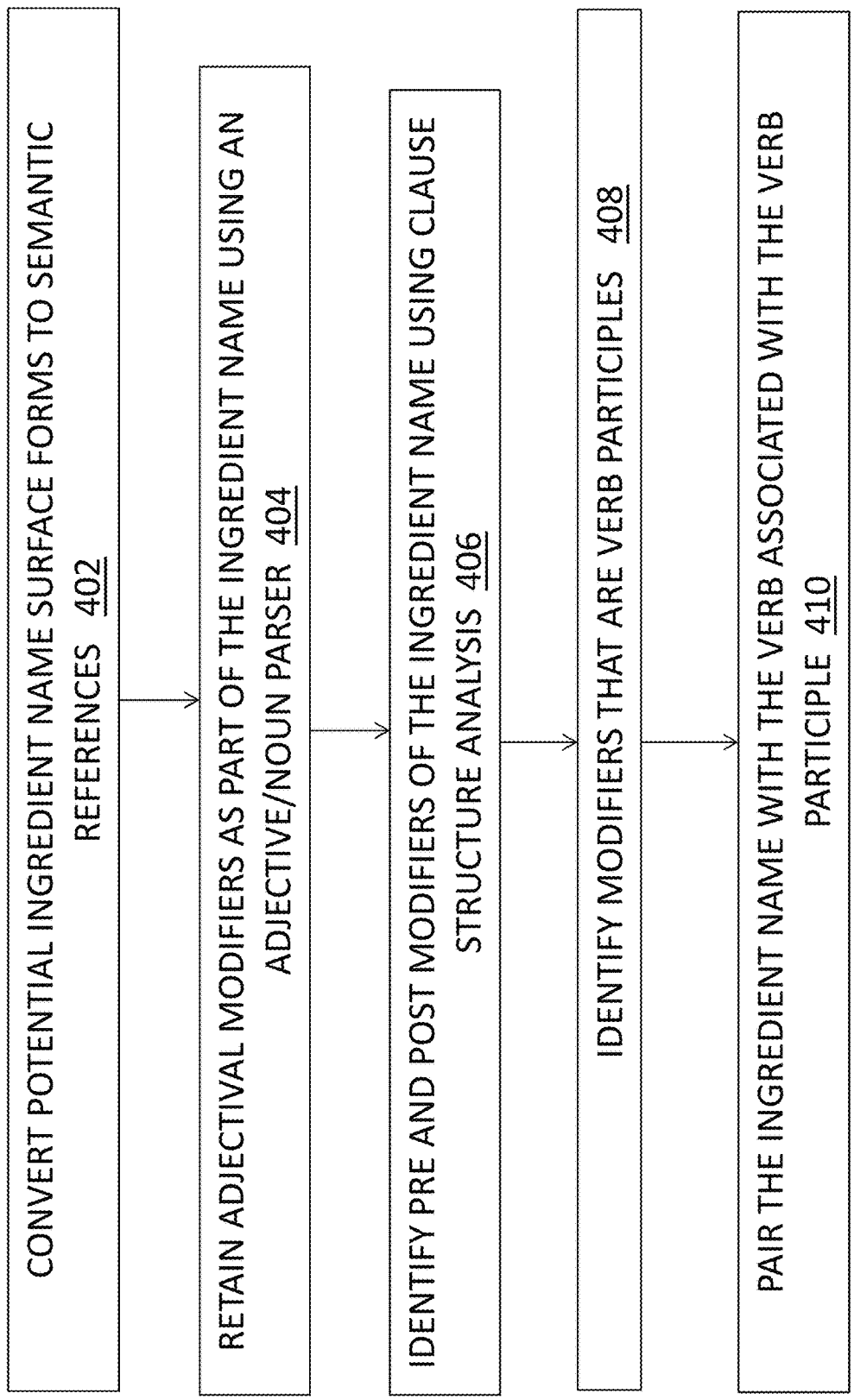
FIG. 4 depicts a flow diagram of a machine learning process for learning food item/action pairs in accordance with an embodiment.

Turning on now to FIG. 4, a flow diagram of a machine learning process for learning food item/action pairs is generally shown in accordance with an embodiment. In an embodiment, the processing shown in FIG. 4 is performed by the food item/action learning engine 202 of FIG. 2 executing on a processor and using all or a subset of the components shown in FIG. 2. In an embodiment, the processing shown in FIG. 4 is performed for each identified ingredient in an ingredient list.

At block 402, the identified ingredient name is converted from its surface form (i.e., the way that is referred to in the recipe) into a corresponding semantic reference (as defined in the cooking lexicon, for example). This processing is performed at block 402 when the surface form and the semantic reference for an identified ingredient differ. An ingredient can be referred to in a number of different manners due to things such as abbreviations, different languages, and/or different regional terms being used for the same food item. Block 402 is performed to provide consistency in the terms for the learning engine. For example, in the recipe ingredient list entry shown in FIG. 1 in the entry that includes "1 tablespoon powdered sugar, sifted", the term "powdered sugar" is replaced with the term "confectionary sugar" resulting in "1 tablespoon confectionary sugar, sifted." In this example, the term "powdered sugar" is the surface form and the term "confectionary sugar" is the semantic reference.

At block 404, the adjectival modifiers for the identified ingredients are retained using, for example an adjective/noun parser (e.g., English Slot Grammar (ESG) parser from IBM or the OpenNLP suite of language processing tools), which can be included in the clause structure analyzer 210 shown in FIG. 2. Referring to the example ingredient list 102 in FIG. 1, applying the processing of block to 404 to the entry "2 large garlic cloves, smashed flat" would result in identifying the ingredient name as "large garlic cloves." Similarly, applying the processing of block 404 to the entry "2 10-ounce frozen uncooked lobster tails, thawed, or 1 pound freshly cooked lobster meat, cut into bite-size pieces" would result in identify the ingredient name as "lobster tail" and "lobster meat." Keeping these two ingredients distinct will result in associating the action "cut" with "lobster meat" which is the correct association. Lobster tail generally has the shell on it, even though it isn't mentioned here, so it would be incorrect to learn from this example that lobster tail can be cut.

At block 406, pre and post modifiers of the identified ingredient are identified using clause structure analysis. For example, for the entry "2 10-ounce frozen uncooked lobster tails, thawed, or 1 pound freshly cooked lobster meat, cut into bite-size pieces" would result in identifying the modifiers "uncooked", "thawed", "cut" and "bite sized pieces" for the identified ingredients "lobster tail" and "lobster meat". Any known parser that can identify adjective/noun pairs can be utilized. The resulting pre and post modifiers of the identified ingredient are input to block 408 where the modifiers that are verb participles are identified. In this example, "uncooked", "thawed", and "cut" are modifiers that can be identified as verb participles. Any known parser that can identify verb participles can be utilized including, but not limited to: English Slot Grammar (ESG) parser from IBM and the OpenNLP suite of language processing tools. In embodiments, the verb participles are identified based on part of speech tags that can be inserted by the parser used to identify pre and post modifiers at block 406. At block 410, the verb participle "uncooked" is replaced with the verb "uncook" and paired with the identified ingredient to form the food item/action pair "lobster tail/uncook." In an embodiment, the verb associated with the verb participle is looked up in a verb lexicon such as the one provide by VerbNet.

Figure 5:
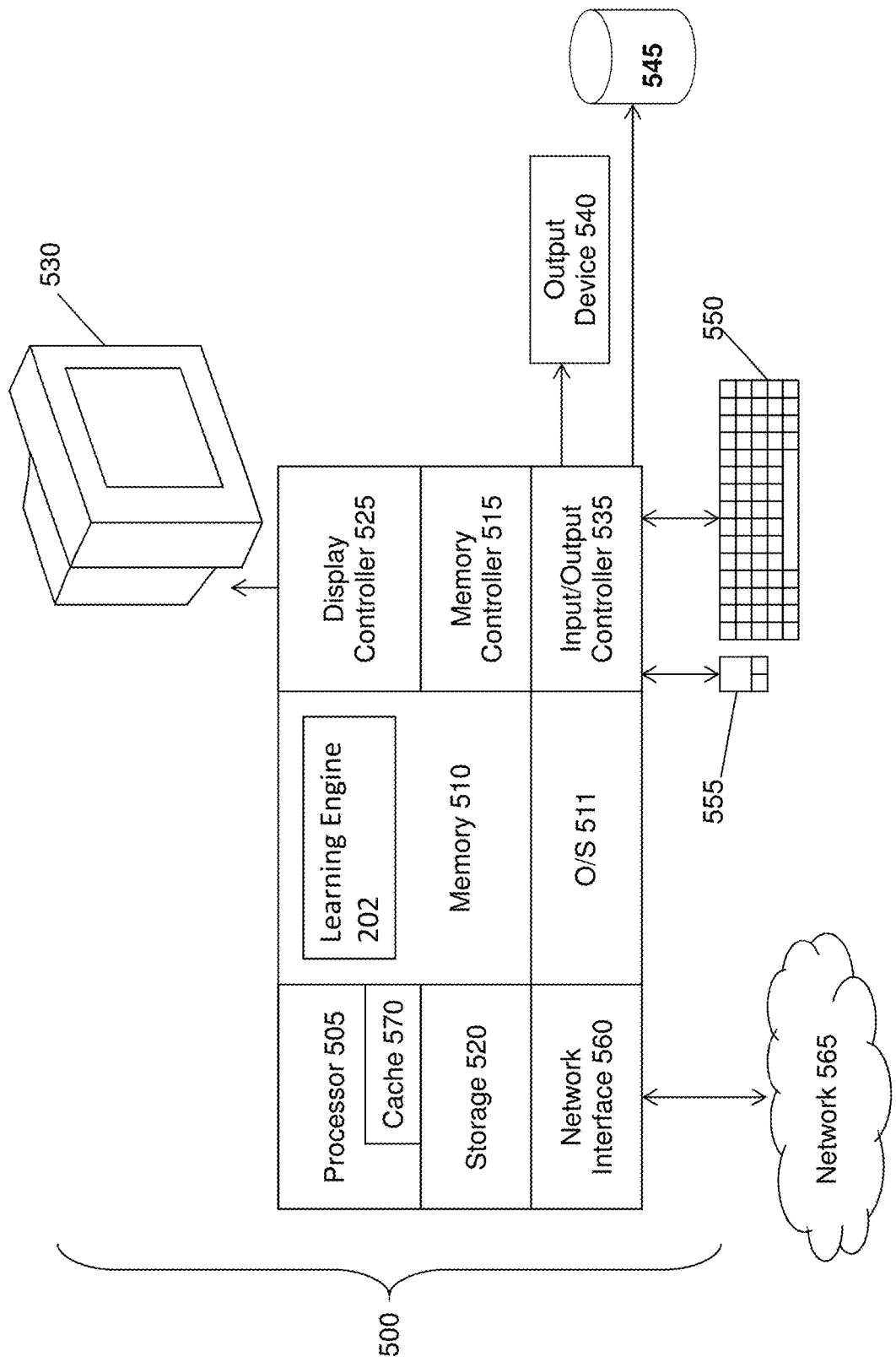
FIG. 5 depicts a block diagram of a computing device for implementing some or all aspects of the system, in accordance with an embodiment.

Turning now to FIG. 5, a block diagram of a computing device for implementing some or all aspects of the system is generally shown in accordance with an embodiment. FIG. 5 illustrates a block diagram of a computing device 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 500, such as a cellular phone, a personal digital assistant (PDA), tablet computer, personal computer, workstation, minicomputer, or mainframe computer for example.

In some embodiments, as shown in FIG. 5, the computing device 500 includes a processor 505, memory 510 coupled to a memory controller 515, and one or more input devices 545, and output devices 540, which are communicatively coupled via a local I/O controller 535. These devices 540, 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computing device 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505. For example, the corpus of recipes 204, learned food item/action pairs 206, verb lexicon 208, and/or cooking domain lexicon 212 can be stored remotely from each other or the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services. The instructions in the memory also include instructions for implementing embodiments of the learning engine 202 described herein.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computing device 500 may further include a display controller 525 coupled to a display 530. In some embodiments, the computing device 500 may further include a network interface 560 for coupling to a network 565. The network 565 may be an IP-based network for communication between the computing device 500 and an external server, client and the like via a broadband connection. The network 565 transmits and receives data between the computing device 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 500, such as that illustrated in FIG. 5.

Technical effects and benefits include the ability to learn food item/action pairs based on a corpus of recipe documents. The learned pairs can be used as input to automated recipe generation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
  receiving an ingredient list of a recipe stored in an electronic format in a corpus of recipes, the ingredient list including a plurality of entries, each of the entries comprising one or more words;
  for each multi-word entry in the ingredient list:
    identifying an ingredient associated with the entry, the identifying including comparing words contained in the entry to terms in a lexicon of cooking domain terms;
    determining whether an action corresponds to the identified ingredient, the determining including parsing the entry to locate a verb that is associated with the identified ingredient; and
    based on determining that an action corresponds to the identified ingredient, outputting a food item action pair that includes the identified ingredient and the located verb, wherein the located verb indicates that the action is performed on the identified ingredient and wherein the outputting is to a database;
  outputting at least one additional food item action pair for at least one of the multi-word entries in the ingredient list; and
  executing, at a computer, a recipe generator to automatically create a description of a new recipe not contained in the corpus of recipes using cognitive computing, the description of the new recipe including one of the food item action pairs.

2. The method of claim 1, wherein a plurality of ingredients are associated with at least one of the entries.

3. The method of claim 1, wherein the parsing includes using clause structure analysis to identify one or more modifiers of the identified ingredient.

4. The method of claim 3, wherein the parsing further includes identifying one of the one or more modifiers as a verb participle based, at least in part, on contents of a verb lexicon, and wherein the located verb corresponds to the verb participle.

5. The method of claim 3, wherein the parsing further includes identifying one of the one or more identifiers as a verb participle based, at least in part, on part of speech tags generated by a parser, and wherein the located verb corresponds to the verb participle.

6. The method of claim 1, wherein the identifying further includes at least one of:
  replacing a surface name of the ingredient that is contained in the entry with a semantic reference from the lexicon of cooking domain terms; and
  retaining an adjectival modifier as part of the identified ingredient.

7. The method of claim 1, further comprising:
  performing the receiving, identifying, determining, and outputting a food item action pair for a plurality of recipes in the corpus of recipes; and
  outputting a frequency count of each food item action pair that reflects a number of times that each food item action pair is output, wherein the frequency count is input to the recipe generator.

8. A system, comprising:
  a memory having computer readable instructions; and
  a processor for executing the computer readable instructions, the computer readable instructions including:
    receiving an ingredient list of a recipe stored in an electronic format in a corpus of recipes, the ingredient list including a plurality of entries, each of the entries comprising one or more words;
    for each multi-word entry in the ingredient list:
      identifying an ingredient associated with the entry, the identifying including comparing words contained in the entry to terms in a lexicon of cooking domain terms;
      determining whether an action corresponds to the identified ingredient, the determining including parsing the entry to locate a verb that is associated with the identified ingredient; and based on determining that an action corresponds to the identified ingredient, outputting a food item action pair that includes the identified ingredient and the located verb, wherein the located verb indicates that the action is performed on the identified ingredient and wherein the outputting is to a database;

outputting at least one additional food item action pair for at least one of the multi-word entries in the ingredient list; and executing a recipe generator to automatically create a description of a new recipe, not contained in the corpus of recipes, using cognitive computing, the description of the new recipe including one of the food item action pairs.

9. The system of claim 8, wherein a plurality of ingredients are associated with at least one of the entries.

10. The system of claim 8, wherein the parsing includes using clause structure analysis to identify one or more modifiers of the identified ingredient.

11. The system of claim 10, wherein the parsing further includes identifying one of the one or more modifiers as a verb participle based, at least in part, on contents of a verb lexicon, and wherein the located verb corresponds to the verb participle.

12. The system of claim 10, wherein the parsing further includes identifying one of the one or more identifiers as a verb participle based, at least in part, on part of speech tags generated by a parser, and wherein the located verb corresponds to the verb participle.

13. The system of claim 8, wherein the identifying further includes at least one of:

replacing a surface name of the ingredient that is contained in the entry with a semantic reference from the lexicon of cooking domain terms; and retaining an adjectival modifier as part of the identified ingredient.

14. The system of claim 8, wherein the computer readable instructions further include:

performing the receiving, identifying, determining, and outputting a food item action pair for a plurality of recipes in the corpus of recipes; and outputting a frequency count of each food item action pair that reflects a number of times that each food item action pair is output, wherein the frequency count is input to the recipe generator.

15. A computer program product comprising a non-transitory computer readable storage medium having program instructions embodied therewith, the program instructions executable by a processor to cause the computer processor to perform:

receiving an ingredient list of a recipe stored in an electronic format, the ingredient list including a plurality of entries, each of the entries comprising one or more words;

for each multi-word entry in the ingredient list:

identifying an ingredient associated with the entry, the identifying including comparing words contained in the entry to terms in a lexicon of cooking domain terms;

determining whether an action corresponds to the identified ingredient, the determining including parsing the entry to locate a verb that is associated with the identified ingredient; and based on determining that an action corresponds to the identified ingredient, outputting a food item action pair that includes the identified ingredient and the located verb, wherein the located verb indicates that the action is performed on the identified ingredient and wherein the outputting is to a database;

outputting at least one additional food item action pair for at least one of the multi-word entries in the ingredient list; and executing a recipe generator to automatically create a description of a new recipe, not contained in the corpus of recipes, using cognitive computing, the description of the new recipe including one of the food item action pairs.

16. The computer program product of claim 15, wherein a plurality of ingredients are associated with at least one of the entries.

17. The computer program product of claim 15, wherein the parsing includes using clause structure analysis to identify one or more modifiers of the identified ingredient.

18. The computer program product of claim 17, wherein the parsing further includes identifying one of the one or more modifiers as a verb participle based, at least in part, on contents of a verb lexicon, and wherein the located verb corresponds to the verb participle.

19. The computer program product of claim 15, wherein the identifying further includes at least one of:

replacing a surface name of the ingredient that is contained in the entry with a semantic reference from the lexicon of cooking domain terms; and retaining an adjectival modifier as part of the identified ingredient.

20. The computer program product of claim 15, wherein the program instructions further cause the computer processor to perform:

performing the receiving, identifying, determining, and outputting a food item action pair for a plurality of recipes in the corpus of recipes; and outputting a frequency count of each food item action pair that reflects a number of times that each food item action pair is output, wherein the frequency count is input to the recipe generator.

* * * * *